United States Patent
Kim et al.

(10) Patent No.: US 11,726,620 B2
(45) Date of Patent: Aug. 15, 2023

(54) ELECTRONIC DEVICE INCLUDING GRIP SENSOR

(71) Applicant: Samsung Electronics Co., Ltd., Suwon-si (KR)

(72) Inventors: Sanguk Kim, Suwon-si (KR); Younghak Park, Suwon-si (KR); Joosung Kim, Suwon-si (KR); Doil Ku, Suwon-si (KR); Younggil Gi, Suwon-si (KR); Yonghee Yang, Suwon-si (KR); Youngsub Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/673,053

(22) Filed: Feb. 16, 2022

(65) Prior Publication Data
US 2022/0374095 A1   Nov. 24, 2022

Related U.S. Application Data

(63) Continuation of application No. PCT/KR2022/001037, filed on Jan. 20, 2022.

(30) Foreign Application Priority Data

May 20, 2021   (KR) ........................ 10-2021-0064778

(51) Int. Cl.
*G06F 3/044* (2006.01)
*H04B 1/40* (2015.01)

(52) U.S. Cl.
CPC .... *G06F 3/044* (2013.01); *G06F 2203/04112* (2013.01); *H04B 1/40* (2013.01)

(58) Field of Classification Search
CPC .. G06F 3/044; G06F 2203/04112; H04B 1/40
See application file for complete search history.

(56) References Cited

U.S. PATENT DOCUMENTS

| 11,418,230 B2* | 8/2022 | Noh ..................... H04M 1/026 |
| 2012/0206556 A1* | 8/2012 | Yu ......................... H04W 52/38 |
| | | 348/14.02 |

(Continued)

FOREIGN PATENT DOCUMENTS

| JP | 6275948 | 2/2018 |
| JP | 6478655 | 3/2019 |

(Continued)

OTHER PUBLICATIONS

Search Report and Written Opinion dated Apr. 28, 2022 in counterpart International Patent Application No. PCT/KR2022/001037.

*Primary Examiner* — Michael Pervan
(74) *Attorney, Agent, or Firm* — Nixon & Vanderhye, P.C.

(57) ABSTRACT

According to various embodiments of the disclosure, an electronic device may comprise: a housing including: a first surface, a second surface facing in a direction opposite to the first surface, and a side surface at least partially surrounding a space between the first surface and the second surface; a printed circuit board disposed between the first surface and the second surface; a first sensing element including a plurality of conductive vias arranged in parallel to the side surface in at least a portion of an edge of the printed circuit board; and a grip sensor electrically connected with the first sensing element. The grip sensor may be configured to detect a change in capacitance due to an approach or contact state of an external object to the housing, in at least a portion of the side surface of the housing using the first sensing element.

20 Claims, 11 Drawing Sheets

(56) References Cited

U.S. PATENT DOCUMENTS

| | | |
|---|---|---|
| 2015/0003551 A1 | 1/2015 | Kim |
| 2015/0296065 A1 | 10/2015 | Narita et al. |
| 2017/0331175 A1 | 11/2017 | Kwon et al. |
| 2019/0067801 A1 | 2/2019 | Kang et al. |
| 2020/0106167 A1* | 4/2020 | Moon .................. H01Q 1/243 |
| 2020/0194928 A1 | 6/2020 | Yeo et al. |
| 2020/0310576 A1 | 10/2020 | Bok |
| 2021/0066197 A1 | 3/2021 | We et al. |
| 2021/0091816 A1 | 3/2021 | Noh et al. |
| 2021/0159596 A1 | 5/2021 | Park et al. |
| 2021/0185164 A1* | 6/2021 | Jung ..................... H04B 1/50 |

FOREIGN PATENT DOCUMENTS

| | | |
|---|---|---|
| KR | 10-2015-0001072 | 1/2015 |
| KR | 10-2017-0128015 | 11/2017 |
| KR | 10-2019-0023995 | 3/2019 |
| KR | 10-2019-0026272 | 3/2019 |
| KR | 10-2020-0115797 | 10/2020 |
| KR | 10-2021-0034994 | 3/2021 |

\* cited by examiner

ELECTRONIC DEVICE INCLUDING GRIP SENSOR

CROSS-REFERENCE TO RELATED APPLICATIONS

This application is a continuation of International Application No. PCT/KR2022/001037 designating the United States, filed on Jan. 20, 2022, in the Korean Intellectual Property Receiving Office and claiming priority to Korean Patent Application No. 10-2021-0064778, filed on May 20, 2021, in the Korean Intellectual Property Office, the disclosures of which are incorporated by reference herein i their entireties.

BACKGROUND

Field

The disclosure relates to an electronic device, e.g., an electronic device including a grip sensor.

Description of Related Art

The growth of electronics, information, and communication technologies leads to integration of various functions into a single electronic device. For example, smartphones pack the functionalities of a sound player, imaging device, and scheduler, as well as the communication functionality and, on top of that, may implement more various functions by having applications installed thereon. An electronic device may not only its equipped applications or stored files but also access, wiredly or wirelessly, a server or another electronic device to receive, in real-time, various pieces of information.

As various functions are mounted on miniaturized electronic devices, such as smart phones, convenience of use is further enhanced. For example, the function of automatically adjusting screen brightness by detecting the external light or the function of rotating the screen by detecting the alignment direction with respect to gravity have become common functions for electronic devices including a display. As such, the electronic device may detect its operating environment by including various types of sensors and may adjust its operation mode based on the detected environment.

As electronic devices are miniaturized, various sensor modules may also be miniaturized and advanced. For example, a display may include a touch sensor detecting the processor of touch input and may further include a pressure sensor, which detects pressure according to the specifications required for the electronic device and a digitizer for detecting input based on the magnetic field, thereby implementing various types of input. The touch sensor may detect a change in capacitance when an external object, e.g., the user's body portion, such as a finger, approaches or contacts the area in which the transparent electrodes are arranged. The electronic device may recognize the user input based on the change in capacitance. Similar to the touch sensor, the electronic device may include a grip sensor to thereby detect or recognize whether the electronic device is gripped. For example, the grip sensor may detect a change in capacitance using a sensing element in a designated position. However, depending on the shape of the electronic device, e.g., in an electronic device manufactured to have a small thickness of about 10 mm or less, a deviation may occur in the sensitivity or grip detection accuracy of the grip sensor depending on the gripping direction.

The above-described information may be provided as background for the purpose of helping understanding of the disclosure. No claim or determination is made as to whether any of the foregoing is applicable as background art in relation to the disclosure.

SUMMARY

Various embodiments of the disclosure are to address the foregoing issues and/or disadvantages and to provide the following advantages. Accordingly, embodiments of the disclosure may provide an electronic device including a grip sensor having enhanced sensitivity or grip detection accuracy.

Embodiments of the disclosure may provide an electronic device including a grip sensor that may mitigate a deviation in sensitivity or grip detection accuracy depending on the exterior shape.

Other aspects according to various example embodiments will be apparent from the following detailed description and would be partially apparent from the description or appreciated through the suggested example embodiments.

According to various example embodiments of the disclosure, an electronic device may comprise: a housing including: a first surface, a second surface facing in a direction opposite the first surface, and a side surface at least partially surrounding a space between the first surface and the second surface; a printed circuit board disposed between the first surface and the second surface; a first sensing element including a plurality of conductive vias arranged in parallel to the side surface in at least a portion of an edge of the printed circuit board; and a grip sensor electrically connected with the first sensing element. The grip sensor may be configured to detect a change in capacitance due to an approach or contact state of an external object to the housing in at least a portion of the side surface of the housing using the first sensing element.

According to various example embodiments of the disclosure, an electronic device may comprise: a housing including: a first surface, a second surface facing in a direction opposite to the first surface, and a side surface at least partially surrounding a space between the first surface and the second surface; a printed circuit board disposed between the first surface and the second surface; a first sensing element including a plurality of conductive vias arranged in parallel to the side surface in at least a portion of an edge of the printed circuit board, a second sensing element comprising a conductor disposed adjacent to the first sensing element between the printed circuit board and the second surface and disposed to face the second surface, a communication module comprising communication circuitry electrically connected with the second sensing element and configured to perform wireless communication using the second sensing element, and a grip sensor electrically connected to the first sensing element and the second sensing element. The grip sensor may be configured to detect a change in capacitance due to an approach or contact state of an external object to the housing using the first sensing element or the second sensing element.

According to various example embodiments of the disclosure, it is possible to enhance the sensitivity or accuracy of grip detection by including a sensing element implemented as a combination of conductive vias arranged on the edge of the printed circuit board. For example, since the first sensing element may have a width or area corresponding to the thickness of the printed circuit board, it is possible to create a change in capacitance to an appropriate level, due to approach of an external object, even on a side surface of the housing or electronic device manufactured to be thin (e.g., a thickness of about 10 mm or less). Thus, although thinned, the electronic device may easily detect the user's grip or grip state on a side surface thereof. According to various example embodiments, the electronic device may further include a second sensing element disposed to face forward or rearward, and the second sensing element may detect a grip or grip state in a different direction from the first sensing element. In various embodiments, the second sensing element may be connected with the communication module to perform wireless communication, allowing it easier to place sensors or antennas in the miniaturized electronic device. Other various effects may be provided directly or indirectly in the disclosure.

BRIEF DESCRIPTION OF THE DRAWINGS

The above and other aspects, features, and/or advantages of certain embodiments of the present disclosure will be more apparent from the following detailed description, taken in conjunction with the accompanying drawings, in which.

Throughout the drawings, like reference numerals may be assigned to like parts, components, and/or structures.

DETAILED DESCRIPTION

The following description taken in conjunction with the accompanying drawings may provide an understanding of various example implementations of the disclosure including the claims and equivalents thereto. The example embodiments disclosed in the following description entail various specific details to aid understanding, but are regarded as one of various example embodiments. Accordingly, it will be apparent to those skilled in the art that various changes and modifications may be made to the various implementations described in the disclosure without departing from the scope and spirit of the disclosure. Further, descriptions of well-known functions and configurations may be omitted for clarity and brevity.

The terms and words used in the following description and claims are not limited to the bibliographical meaning, but may be used to clearly and consistently describe the various embodiments of the disclosure. Therefore, it will be apparent to those skilled in the art that the following description of various implementations of the disclosure is provided for the purpose of description, not for the purpose of limiting the disclosure defined as the scope of the claims and equivalent thereto.

The singular forms "a," "an," and "the" are intended to include the plural forms as well, unless the context clearly indicates otherwise. Thus, as an example, "a component surface" may be understood as including one or more of the surfaces of a component.

Figure 1:
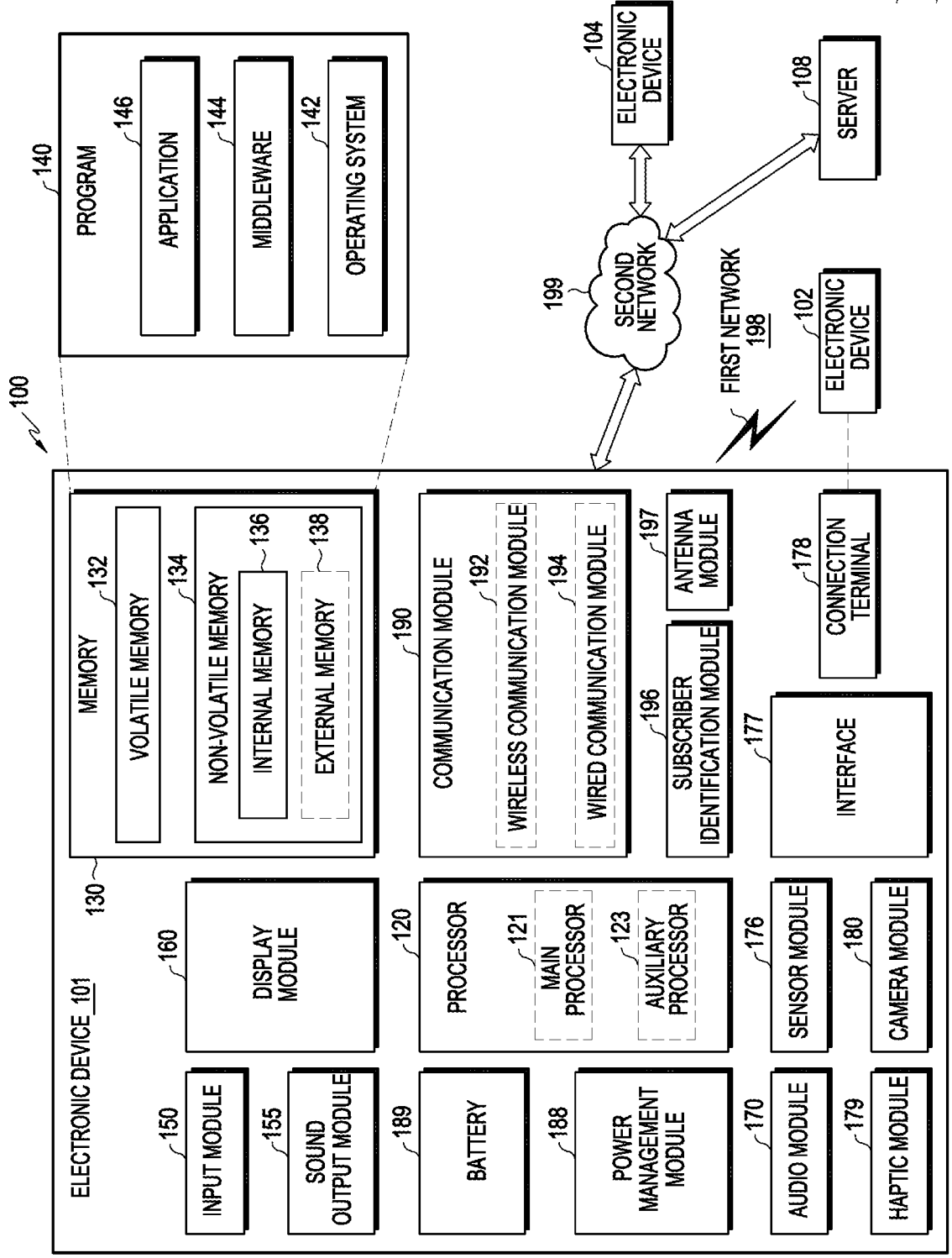
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, various (e.g., the sensor module 176, the camera module 180, or the antenna module 197) components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following detailed description, a length direction, a width direction, and/or a thickness direction of the electronic device may be mentioned and may be referred to, for example, as a 'Y-axis direction,' 'X-axis direction', and/or 'Z-axis direction,' respectively. In various embodiments, 'negative/positive (−/+)' may be mentioned together with the Cartesian coordinate system illustrated by way of example in the drawings with respect to the direction in which the component is oriented. For example, the front surface of the electronic device or housing may be defined as a 'surface facing in the +Z direction,' and the rear surface may be defined as a 'surface facing in the −Z direction'. In various embodiments, the side surface of the electronic device or housing may include an area facing in the +X direction, an area facing in the +Y direction, an area facing in the −X direction, and/or an area facing in the −Y direction. In an embodiment, the 'X-axis direction' may include both the '−X direction' and the '+X direction'. It should be noted that the directions are so referenced with respect to the Cartesian coordinate system shown in the drawings for the sake of brevity of description, and the description of these directions or components do not limit various embodiments of the disclosure.

Figure 2:
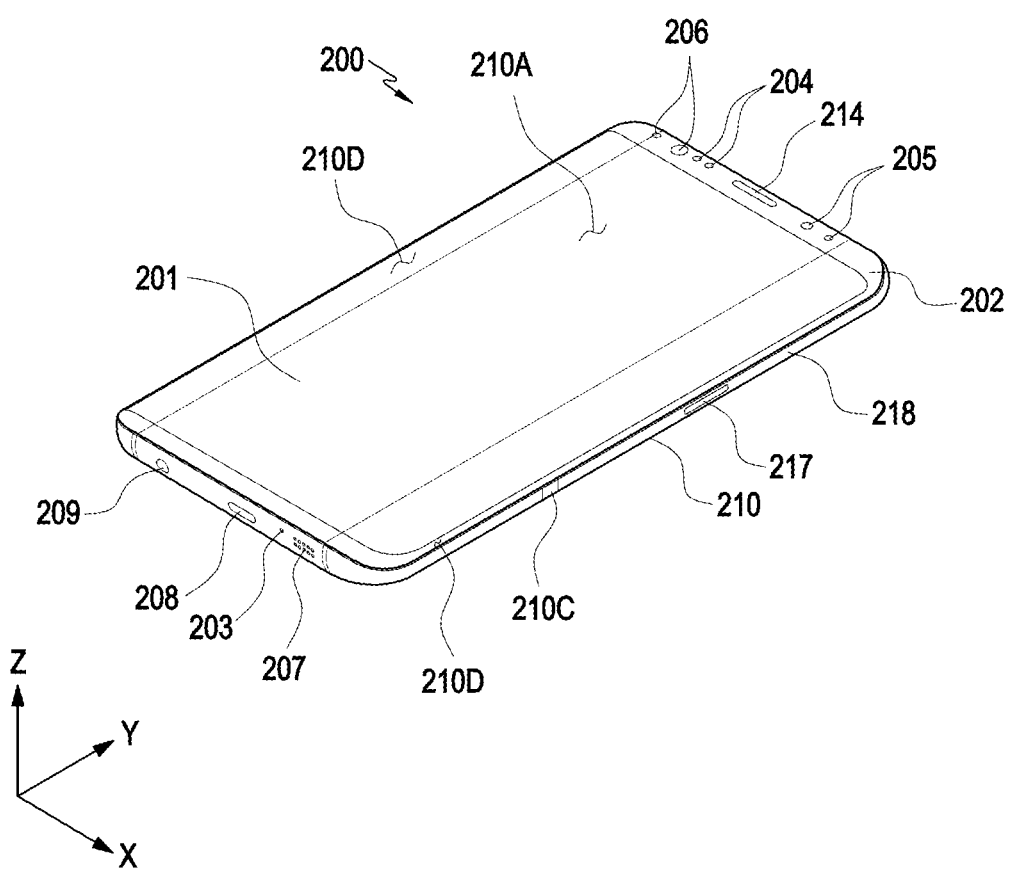
FIG. 2 is a front perspective view illustrating an electronic device according to various embodiments.
Figure 3:
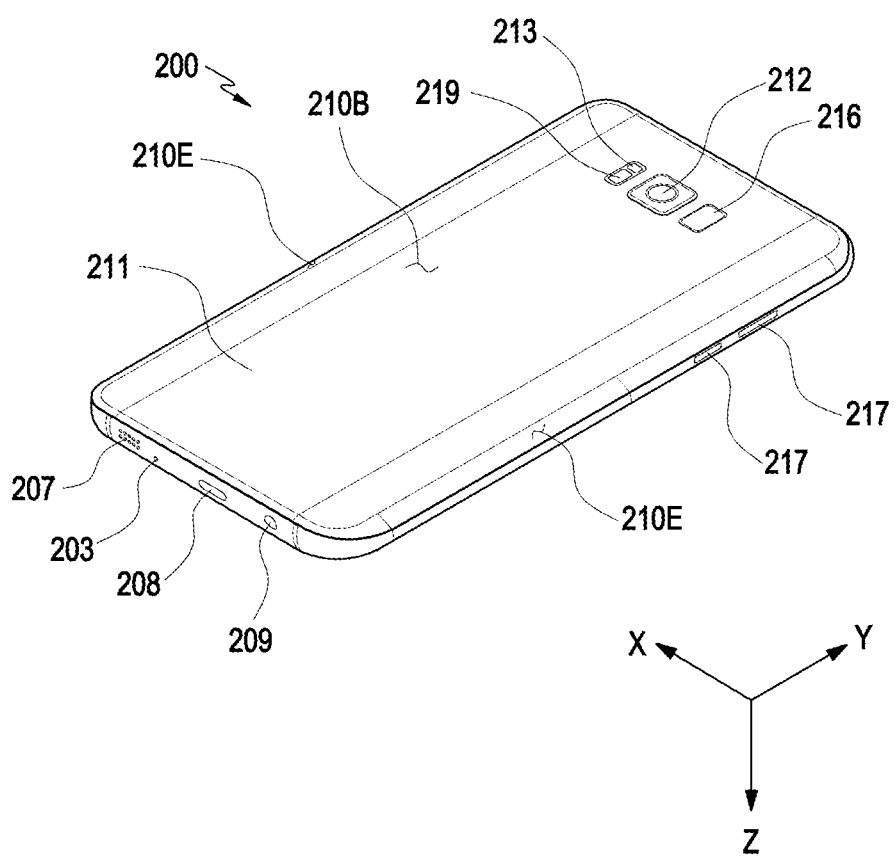
FIG. 3 is a rear perspective view illustrating the electronic device of FIG. 2 according to various embodiments.

FIG. 2 is a front perspective view illustrating an example electronic device 200 according to various embodiments. FIG. 3 is a rear perspective view illustrating the electronic device 200 of FIG. 2 according to various embodiments.

Referring to FIGS. 2 and 3, according to an embodiment, an electronic device 200 may include a housing 210 including a first surface (or front surface) 210A, a second surface (or rear surface) 210B, and a side surface 210C surrounding a space between the first surface 210A and the second surface 210B. According to an embodiment (not shown), the housing may denote a structure forming part of the first surface 210A, the second surface 210B, and the side surface 210C of FIG. 2. According to an embodiment, at least part of the first surface 210A may have a substantially transparent front plate 202 (e.g., a glass plate or polymer plate including various coat layers). The second surface 210B may be formed by a rear plate 211 that is substantially opaque. The rear plate 211 may be formed of, e.g., laminated or colored glass, ceramic, polymer, metal (e.g., aluminum, stainless steel (STS), or magnesium), or a combination of at least two thereof. The side surface 210C may be formed by a side structure 218 that couples to the front plate 202 and the rear plate 211 and includes a metal and/or polymer. According to an embodiment, the rear plate 211 and the side structure 218 may be integrally formed together and include the same material (e.g., a metal, such as aluminum).

In the embodiment illustrated, the front plate 202 may include two first areas 110D, which seamlessly and bendingly extend from the first surface 210A to the rear plate 211, on both the long edges of the front plate 202. In the embodiment (refer to FIG. 3) illustrated, the rear plate 211 may include second areas 210E, which seamlessly and bendingly extend from the second surface 210B to the front plate 202, on both the long edges. According to an embodiment, the front plate 202 (or the rear plate 211) may include only one of the first areas 210D (or the second areas 210E). Alternatively, the first areas 210D or the second areas 210E may partially be excluded. According to embodiments, at side view of the electronic device 200, the side structure 218 may have a first thickness (or width) for sides that do not have the first areas 210D or the second areas 210E and a second thickness, which is smaller than the first thickness, for sides that have the first areas 210D or the second areas 210E.

According to an embodiment, the electronic device 200 may include at least one or more of a display 201, audio modules 203, 207, and 214, sensor modules 204, 216, and 219, camera modules 205, 212, and 213, key input devices 217, a light emitting device 206, and connector holes 208 and 209. According to an embodiment, the electronic device 200 may exclude at least one (e.g., the key input device 217 or the light emitting device 206) of the components or may add other components.

The display 201 may be visible through a significant portion of the front plate 202. According to an embodiment, at least a portion of the display 201 may be visible through the front plate 202 forming the first surface 210A and the first areas 210D of the side surface 210C. According to an embodiment, the edge of the display 201 may be formed to be substantially the same in shape as an adjacent outer edge of the front plate 202. According to an embodiment (not shown), the interval between the outer edge of the display 201 and the outer edge of the front plate 202 may remain substantially even to give a larger area of exposure the display 201.

According to an embodiment (not shown), the screen display area of the display 201 may have a recess or opening in a portion thereof, and at least one or more of the audio module 214, sensor module 204, camera module 205, and light emitting device 206 may be aligned with the recess or opening. According to an embodiment (not shown), at least one or more of the audio module 214, sensor module 204, camera module 205, fingerprint sensor 216, and light emitting device 206 may be included on the rear surface of the screen display area of the display 201. According to an embodiment (not shown), the display 201 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor modules 204 and 219 and/or at least part of the key input devices 217 may be disposed in the first areas 210D and/or the second areas 210E.

The audio modules 203, 207, and 214 may include a microphone hole 203 and speaker holes 207 and 214. The microphone hole 203 may have a microphone inside to obtain external sounds. According to an embodiment, there may be a plurality of microphones to be able to detect the direction of a sound. The speaker holes 207 and 214 may include an external speaker hole 207 and a phone receiver hole 214. According to an embodiment, the speaker holes 207 and 214 and the microphone hole 203 may be implemented as a single hole, or speakers may be included without the speaker holes 207 and 214 (e.g., piezo speakers).

The sensor modules 204, 216, and 219 may generate an electrical signal or data value corresponding to an internal operating state or external environmental state of the electronic device 200. The sensor modules 204, 216, and 219 may include a first sensor module 204 (e.g., a proximity sensor) disposed on the first surface 210A of the housing 210, and/or a second sensor module (not shown) (e.g., a fingerprint sensor), and/or a third sensor module 219 (e.g., a heart-rate monitor (HRM) sensor) disposed on the second surface 210B of the housing 210, and/or a fourth sensor module 216 (e.g., a fingerprint sensor). The fingerprint sensor may be disposed on the second surface 210B as well as the first surface 210A (e.g., the display 201) of the housing 210. The electronic device 200 may further include the sensor module of FIG. 1, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 204.

The camera modules 205, 212, and 213 may include a first camera device 205 disposed on the first surface 210A of the electronic device 200, and a second camera device 212 and/or a flash 213 disposed on the second surface 210B. The camera modules 205 and 212 may include one or more lenses, an image sensor, and/or an image signal processor. The flash 213 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 200.

The key input device 217 may be disposed on the side surface 210C of the housing 210. According to an embodiment, the electronic device 200 may exclude all or some of the above-mentioned key input devices 217 and the excluded key input devices 217 may be implemented in other forms, e.g., as soft keys, on the display 201. According to an embodiment, the key input device may include the sensor module 216 disposed on the second surface 210B of the housing 210.

The light emitting device 206 may be disposed on, e.g., the first surface 210A of the housing 210. The light emitting device 206 may provide, e.g., information about the state of the electronic device 200 in the form of light. According to an embodiment, the light emitting device 206 may provide a light source that interacts with, e.g., the camera module 205. The light emitting device 206 may include, e.g., a light emitting diode (LED), an infrared (IR) LED, or a xenon lamp.

The connector holes 208 and 209 may include a first connector hole 208 for receiving a connector (e.g., a universal serial bus (USB) connector) for transmitting or receiving power and/or data to/from an external electronic device and/or a second connector hole 209 (e.g., an earphone jack) for receiving a connector for transmitting or receiving audio signals to/from the external electronic device.

Figure 4:
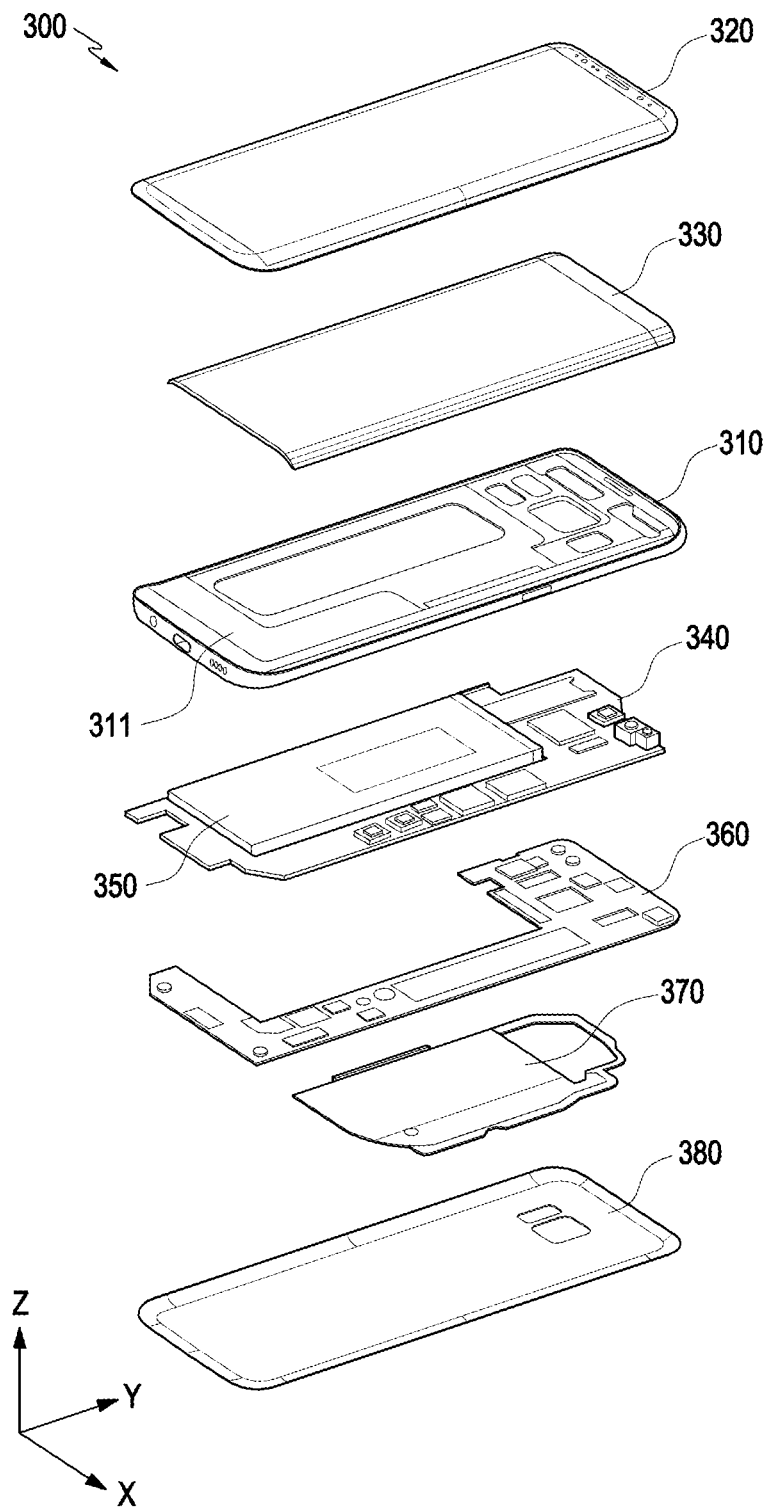
FIG. 4 is an exploded perspective view illustrating the electronic device of FIG. 2 according to various embodiments.

FIG. 4 is an exploded perspective view illustrating the electronic device 300 of FIG. 2 according to various embodiments.

Referring to FIG. 4, an electronic device 300 may include a side structure (e.g., bezel) 310, a first supporting member 311 (e.g., a bracket), a front plate 320, a display 330, a printed circuit board 340, a battery 350, a second supporting member 360 (e.g., a rear case), an antenna 370, and a rear plate 380. According to an embodiment, the electronic device 300 may exclude at least one (e.g., the first supporting member 311 or the second supporting member 360) of the components or may add other components. At least one of the components of the electronic device 300 may be the same or similar to at least one of the components of the electronic device 200 of FIG. 2 or 3 and duplicate description may not be repeated below.

The first supporting member 311 may be disposed inside the electronic device 300 to be connected with the side structure 310 or integrated with the side structure 310. The first supporting member 311 may be formed of, e.g., a metallic material and/or non-metallic material (e.g., polymer). The display 330 may be joined onto one surface of the first supporting member 311, and the printed circuit board 340 may be joined onto the opposite surface of the first supporting member 232. A processor, memory, and/or interface may be mounted on the printed circuit board 340. The processor may include one or more of, e.g., a central processing unit, an application processor, a graphic processing device, an image signal processing, a sensor hub processor, or a communication processor.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 300 with an external electronic device and may include a USB connector, an SD card/multimedia card (MMC) connector, or an audio connector.

The battery 350 may be a device for supplying power to at least one component of the electronic device 300. The battery 189 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 300.

The antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power necessary for charging. According to an embodiment of the present disclosure, an antenna structure may be formed by a portion or combination of the side structure 310 and/or the first supporting member 311.

It should be noted that in the following detailed description, reference may be made to the electronic devices 101, 102, 104, 200, and 300 of the foregoing example embodiments, and components, which may easily be understood through the foregoing example embodiments, are assigned the same reference numerals or omitted and a description thereof may not be repeated.

Figure 5:
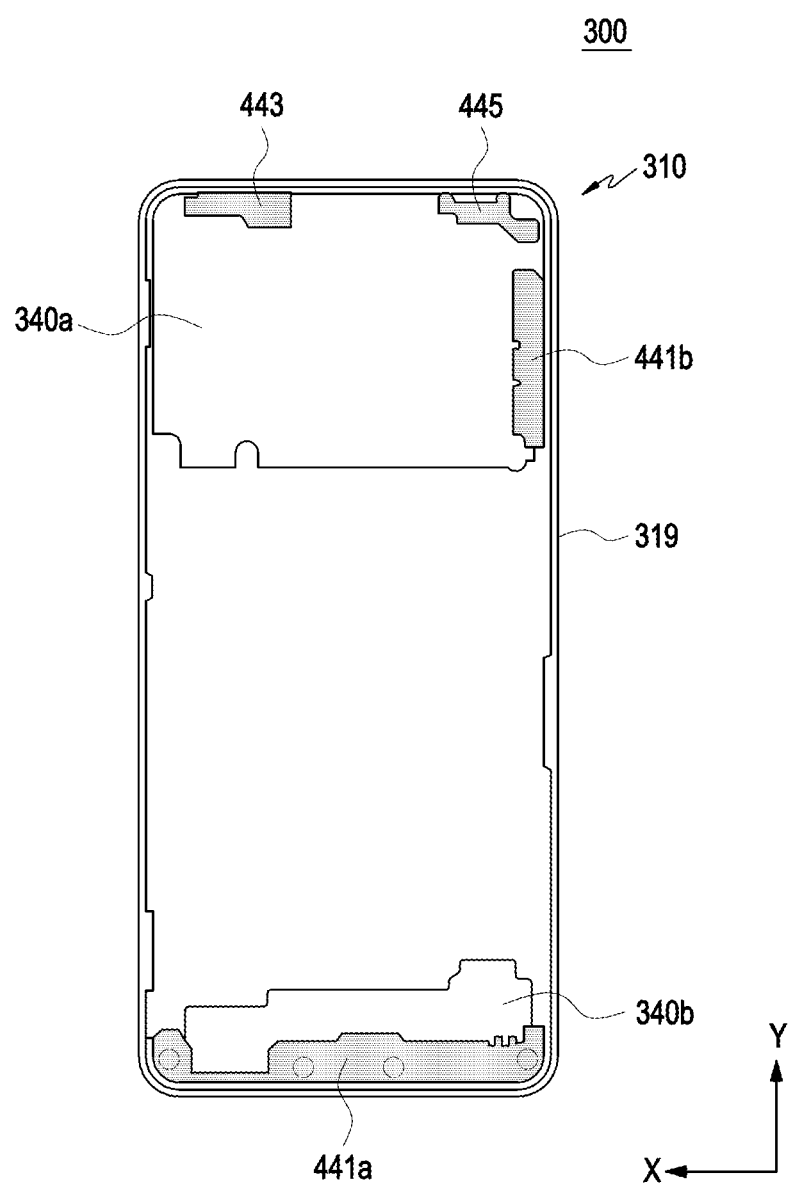
FIG. 5 is a diagram illustrating an example arrangement of antenna(s) in an electronic device according to various embodiments.

FIG. 5 is a diagram illustrating an example arrangement of antenna(s) in an electronic device (e.g., the electronic device 200 or 300 of FIGS. 2 and 3) according to various embodiments.

Referring to FIG. 5, an electronic device 300 may include a plurality of antennas 441a, 441b, 443, and 445 (e.g., the antenna module 197 of FIG. 1). In the illustrated embodiment, the antennas 441a, 441b, 443, and 445 are illustrated by way of non-limiting example as being disposed inside the housing 310. However, when the housing 310 at least partially includes a frame 319 formed of a metallic material or an electrically conductive material, at least a portion of the frame 319 may replace an antenna illustrated or provide an additional antenna. Among the antennas 441a, 441b, 443, and 445, a first antenna 441a or a second antenna 441b may be a legacy antenna for 3G or 4G communication and may be used for wireless communication in different frequency bands. A third antenna 443 among the antennas 441a, 441b, 443, and 445 may function as a diversity antenna. For example, the third antenna 443 may simultaneously perform wireless communication in the same frequency band as another antenna (e.g., any one of the first and second antennas 441a and 441b or a fourth antenna 445 to be described below), thereby implementing a MIMO operation. In an embodiment, the fourth antenna 445 may function as an antenna for Wi-Fi or Bluetooth communication. The antennas 441a, 441b, 443, and 445 may be disposed in appropriate positions considering the actual use environment of the electronic device or the internal/external structure of the electronic device 300. Some of the illustrated antennas 441a, 441b, 443, and 445 may be omitted or an unillustrated antenna may be additionally disposed.

According to various embodiments, the electronic device 300 may have a thickness of about 10 mm or less and a width or length of several tens of mm or more. In an embodiment, the antennas 441a, 441b, 443, and 445 may have various patterns, shapes, or surface areas when viewed in the Z-axis direction, and the cross section taken in the X-axis or Y-axis direction has a fairly small thickness. For example, when viewed in the plan view illustrating FIG. 5, each of the antennas has a designated shape or pattern and may have a surface area enough to be noticeable to the naked eye. On the other hand, when viewed in the X-axis direction or the Y-axis direction, the antennas 441a, 441b, 443, and 445 may be seen as substantially linear. As is described below, at least one of the antennas 441a, 441b, 443, and 445 may be electrically connected with a grip sensor (e.g., the sensor module 176 of FIG. 1) and may be used as a sensing element.

In an embodiment, the electronic device 300 may include a first printed circuit board 340a and/or a second printed circuit board 340b and may be electrically connected with the first printed circuit board 340a and the second printed circuit board 340b through a flexible printed circuit board or a coaxial cable (not shown). In an embodiment, the first printed circuit board 340a and the second printed circuit board 340b may be manufactured as a single board like the printed circuit board 340 of FIG. 4. The antennas 441a, 441b, 443, and 445 may be electrically connected with any one of the printed circuit boards 340a and 340b or the communication module 190 of FIG. 1 and be used for wireless communication. In an embodiment, the electronic device 300 may include at least one carrier 449 (refer to FIG. 6), and that the antennas 441a, 441b, 443, and 445 may be disposed on the surface of a carrier 449. For example, the antennas 441a, 441b, 443, and 445 may be disposed on the surface of the carrier 449, in the form of a metal layer formed by plating or deposition or a thin metal plate, such as foil. In an embodiment, at least one of the antennas 441a, 441b, 443, and 445 may be manufactured in the form of a flexible printed circuit board and, in this case, the carrier 449 may be omitted.

Figure 6:
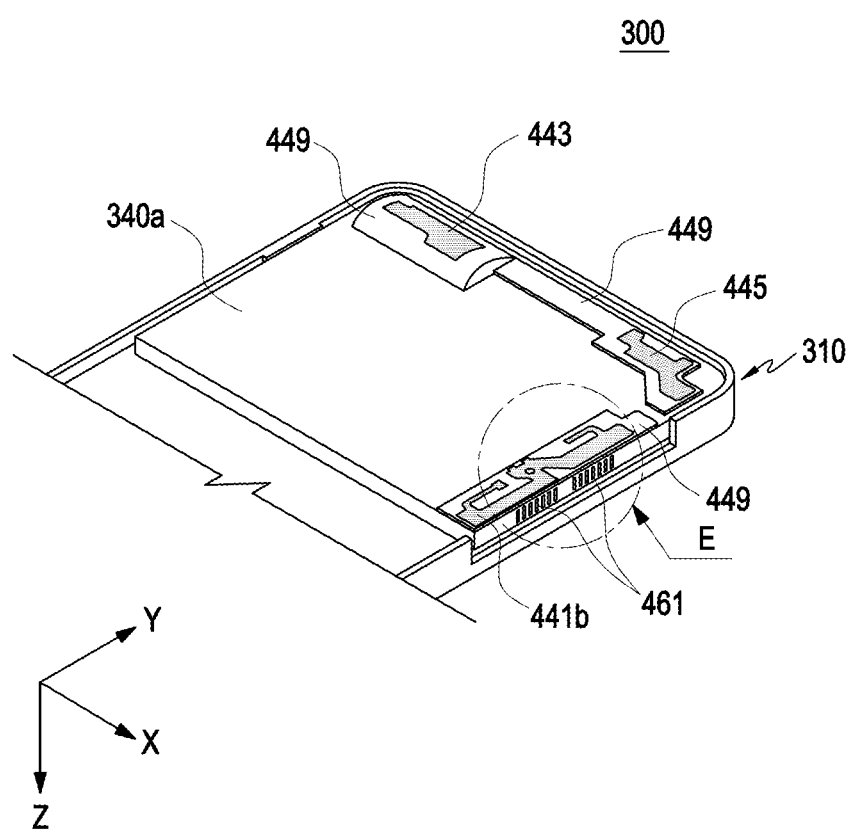
FIG. 6 is a partial sectional perspective view illustrating a state in which a first sensing element of an electronic device is disposed according to various embodiments.

FIG. 6 is a partial sectional perspective view illustrating a state in which a first sensing element 461 of an electronic device (e.g., the electronic device 200 or 300 of FIGS. 2 to 4) is disposed according to various embodiments.

Referring to FIG. 6, an electronic device 300 may include a first sensing element 461. The first sensing element 461 may be disposed on, e.g., an edge of a printed circuit board (e.g., the printed circuit board 340 of FIG. 4 or the first printed circuit board 340*a* of FIG. 5), to face a side surface (e.g., the side surface 210C of FIG. 2) of the housing 310 or the electronic device 300. In an embodiment, the first sensing element 461 may have, at least, a width corresponding to at least the thickness of the printed circuit board 340*a* and a designated length in the Y-axis direction and may be disposed adjacent to at least a portion of the outer surface of the housing 310. For example, when viewed in the X-axis direction of FIG. 6, the first sensing element 461 may have a polygonal (e.g., rectangular) shape rather than a line shape. In various embodiments, the first sensing element 461 may include multiple conductive vias, and the structure and shape of the first sensing element 461 is described in greater detail below with reference to FIGS. 7 and 8.

According to various embodiments, the first sensing element 461 may be electrically connected with the sensor module 176 of FIG. 1, e.g., a grip sensor. In various embodiments, the grip sensor may be configured to detect a change in capacitance according to an approach or contact state of an external object to the housing 310 using the first sensing element 461. For example, if the user's body is in contact with the housing 310 in an area adjacent to the first sensing element 461, the grip sensor may detect a change in capacitance or a capacitance of a designated value or more created between the first sensing element 461 and the user's body. According to an embodiment, the electronic device 300 or the processor and/or the grip sensor (e.g., the processor 120 and/or sensor module 176 of FIG. 1) of the electronic device 300 may recognize whether the user grips the electronic device 300 or the housing 310 based on such a change in capacitance or a capacitance of a designated value or more. As such, the first sensing element 461 may be disposed to be oriented in a direction (e.g., the X-axis direction or Y-axis direction) in which a side surface (e.g., the side surface 210C of FIG. 2) of the housing 310 faces and may be used to detect an approach or contact state of an external object (e.g., the user's body) to the side surface of the housing 310, at least, in the oriented direction. In the embodiments of the disclosure, the 'oriented direction' of the first sensing element 461 or the second sensing element (e.g., the second antenna 441*b* described below) may refer, for example, to the direction of an approach or contact of an external object (e.g., the user's body) detected through the first sensing element 461 or the second sensing element.

According to various embodiments, the electronic device 300 may further include a second sensing element (e.g., the second antenna 441*b*) disposed adjacent to the first sensing element 461. In an embodiment, a configuration in which among the antennas 441*a*, 441*b*, 443, and 445, any one, e.g., the second antenna 441*b*, functions as a second sensing element may be illustrated by way of non-limiting example. However, various embodiments of the disclosure are not limited thereto, and a conductor (e.g., a metal layer, a thin metal plate or a flexible printed circuit board) separate from the antennas 441*a*, 441*b*, 443, and 445 may be disposed and used as a second sensing element. It should be noted that in the following detailed description, reference number '441*b*' may be commonly used to denote the second antenna or the second sensing element.

According to various embodiments, the second sensing element 441*b* may be disposed to face any one of a first surface or a second surface (e.g., the first surface 210A of FIG. 2 or the second surface 210B of FIG. 3) inside the housing 310. In various embodiments, if a display (e.g., the display 201 of FIG. 2 or the display 330 of FIG. 4) is disposed on the first side 210A, the second sensing element 441*b* may be disposed to face the second surface 210B. In an embodiment, a position frequently gripped by the user may be predicted considering the appearance or actual use environment of the electronic device 300. Further, the position of the first sensing element 461 or the second sensing element 441*b* may be varied depending on the predicted grip position.

According to various embodiments, the electronic device 300 (e.g., the processor 120 or the communication module 190 of FIG. 1) may perform wireless communication using the second sensing element 441*b*. For example, the second sensing element 441*b* may function as a cellular antenna for access to a 3G or 4G communication network. For example, the second sensing element 441*b* may have a shape considering the communication frequency or a designated pattern, e.g., the size and shape of the placement area or space and may be electrically connected with the processor 120 or communication module 190 of FIG. 1 to perform wireless communication. In an embodiment, the sensor module 176 (e.g., a grip sensor) of FIG. 1 is electrically connected with the second sensing element 441*b* and may be thus configured to detect a change in capacitance according to an approach or contact state of an external object to the housing 310 using the second sensing element 441*b*. For example, the second sensing element 441*b* may be disposed, inside the housing 310, to face the second surface 210B of the housing 310, e.g., in the Z-axis direction or the −Z direction, and may be used to detect an approach or contact state of an external object (e.g., the user's body) to, at least, the second surface 210B of the housing 310.

According to various embodiments, the second sensing element 441*b* may be combined with the first sensing element 461 to be used to detect an approach or contact state of an external object (e.g., the user's body) to the side surface of the housing 310. In an embodiment, the first sensing element 461 may be omitted, and the second sensing element 441*b* alone may be used to detect the approach or contact state of the external object to the side surface of the housing 310. However, as the second sensing element 441*b* has a line shape when viewed in the X-axis direction or the Y-axis direction, it may be limited to create a capacitance between the second sensing element 441*b* and the external object. For example, the second sensing element 441*b* alone may detect an approach or contact state of an external object to the side surface of the housing 310, and when the second sensing element 441*b* is combined with the first sensing element 461, the sensitivity or accuracy of detecting an approach or contact state of an external object may be increased.

Table 1 below shows the results of measurement of the detection performance obtained by the second sensing element 441*b* alone in the X direction or the Y direction and the detection performance obtained by a combination of the first and second sensing elements 461 and 441*b*. 'Difference' denotes an example of a value obtained by measuring a change in capacitance before and after the distance between the sensing element and the external object becomes about 5 mm or less and converting it, and 'recognition distance' denotes an example of the maximum distance in which the grip sensor or processor (e.g., the sensor module 176 or processor 120 of FIG. 1) is able to recognize the approach of the external object. Further, 'case #0' denotes the result of measurement of the performance of the second sensing element 441*b* alone, 'case #1' denotes the result of measurement of the performance when a first sensing element 461 having a length of about 22.2 mm is combined, and 'case #2' denotes the result of measurement of the performance when a first sensing elements 461 having a length of about 15 mm are combined. As shown in the measurement results in Table 1, as the first sensing element 461 is combined and/or as the length (e.g., the length in the Y-axis direction) of the first sensing element 461 increases, it may be identified that a change in capacitance or recognition distance due to an approach or contact state of the external object in the X-axis direction or Y-axis direction is enhanced.

TABLE 1

| case | difference | recognition distance (mm) |
|---|---|---|
| case#0 | 812 | 8 |
| case#1 | 1022 | 10 |
| case#2 | 925 | 9 |

Figure 7:
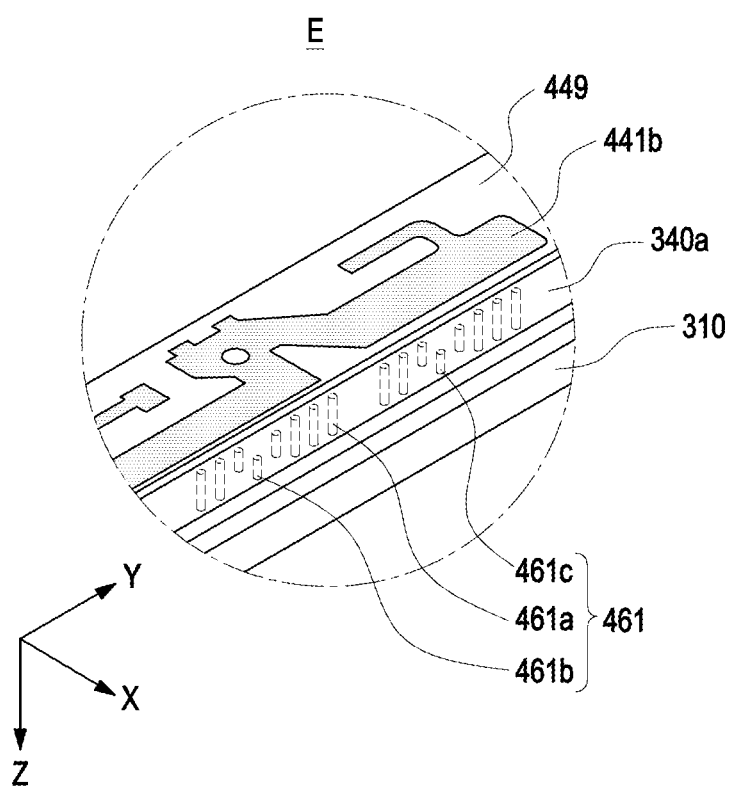
FIG. 7 is an enlarged sectional perspective view illustrating portion 'E' of FIG. 6 according to various embodiments.
Figure 8:
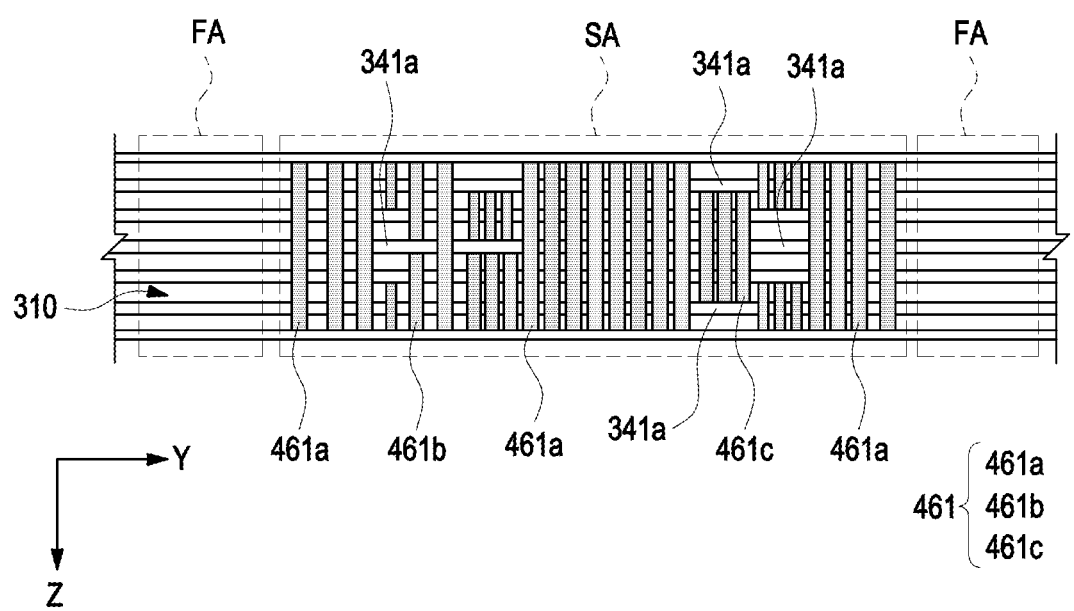
FIG. 8 is a diagram illustrating a side configuration of a first sensing element of an electronic device according to various embodiments.

FIG. 7 is an enlarged view illustrating portion 'E' of FIG. 6 according to various embodiments. FIG. 8 is a diagram illustrating a side configuration of a first sensing element 461 of an electronic device (e.g., the electronic device 200 or 300 of FIGS. 2 to 4) according to various embodiments.

Referring to FIGS. 7 and 8, a first sensing element 461 may include a plurality of conductive vias 461*a*, 461*b*, and 461*c* formed of an electrically conductive material, such as, for example, and without limitation, copper. For example, the conductive vias 461*a*, 461*b*, and 461*c* may be extended obliquely or perpendicular (e.g., the Z-axis direction) to a first surface or second surface (e.g., the first surface 210A of FIG. 2 or the second surface 210B of FIG. 3) of the electronic device 300 and arranged along a direction (e.g., the Y-axis direction) substantially parallel to a side surface (e.g., the side surface 210C of FIG. 2) of the housing 310. The conductive vias 461*a*, 461*b*, and 461*c* are disposed at a predetermined (e.g., specified) distance from other adjacent conductive vias, but may form an electrically flat conductor. For example, when viewed in the X-axis direction, due to the arrangement of the conductive vias 461*a*, 461*b*, and 461*c*, the first sensing element 461 may have a flat plate shape having a width corresponding to the thickness of the printed circuit board 340*a* and a designated length in the Y-axis direction. Accordingly, when an external object, such as the user's body, approaches or is positioned adjacently, the external object and the arrangement (e.g., the first sensing element 461) of the conductive vias 461*a*, 461*b*, and 461*c* may form a capacitance. In an embodiment, the conductive vias 461*a*, 461*b*, and 461*c* on the printed circuit board 340*a* or inside the printed circuit board 340*a* may extend in various lengths or be disposed in various positions. For example, the conductive vias 461*a*, 461*b*, and 461*c* may include a through via 461*a*, a 1-2 or 1-3 via 461*b*, and/or an internal via 461*c*.

According to various embodiments, when viewed in the X-axis direction, the conductive vias 461*a*, 461*b*, and 461*c* may be disposed to form a first sensing element 461 in a designated area SA. Further, a fill-cut area FA in which no conductor or conductive material is disposed or removed may be provided around the first sensing element 461. For example, as the area around the first sensing element 461 is formed as the fill-cut area FA, it is possible to more accurately detect an approach or contact state of an external object in a designated position or area SA. In an embodiment, the printed circuit board 340*a* may be a multi-layered circuit board, and a designated signal line (e.g., a printed circuit pattern) may be disposed on each layer.

According to various embodiments, the printed circuit board 340*a* may include a plurality of conductive layers 341*a* or a plurality of conductive patterns sequentially stacked on at least an edge or at least a portion of the edge. In various embodiments, the plurality of conductive layers 341*a* or the plurality of conductive patterns may have a line shape with a designated width when viewed in plan view (e.g., viewed in the Z-axis direction) and may include an electrically conductive material. In an embodiment, when the plurality of conductive layers 341*a* or the plurality of conductive patterns are disposed in the area where the first sensing element 461 is formed, at least one of the conductive vias 461*a*, 461*b*, and 461*c* may electrically connect at least two of the plurality of conductive layers 341*a* or at least two of the plurality of conductive patterns. For example, among the conductive vias 461*a*, 461*b*, and 461*c*, a through via 461*a* may electrically connect all of the plurality of conductive layers 341*a*. Among the conductive vias 461*a*, 461*b* and 461*c*, an internal via 341*c* may electrically connect at least two conductive layers 341*a* adjacent, in the printed circuit board 340*a*. For example, as the conductive vias 461*a*, 461*b*, and 461*c* and the conductive layers 341*a* (or conductive patterns) are combined, when viewed in the X-axis direction, the first detection conductor 461 may have a mesh shape. According to an embodiment, as compared to the structure including only the conductive vias 461*a*, 461*b*, and 461*c*, a combination of the conductive vias 461*a*, 461*b*, 461*c* and the conductive layers 341*a* renders it possible to more accurately detect an approach or contact state of an external object using the first sensing element 461.

Figure 9:
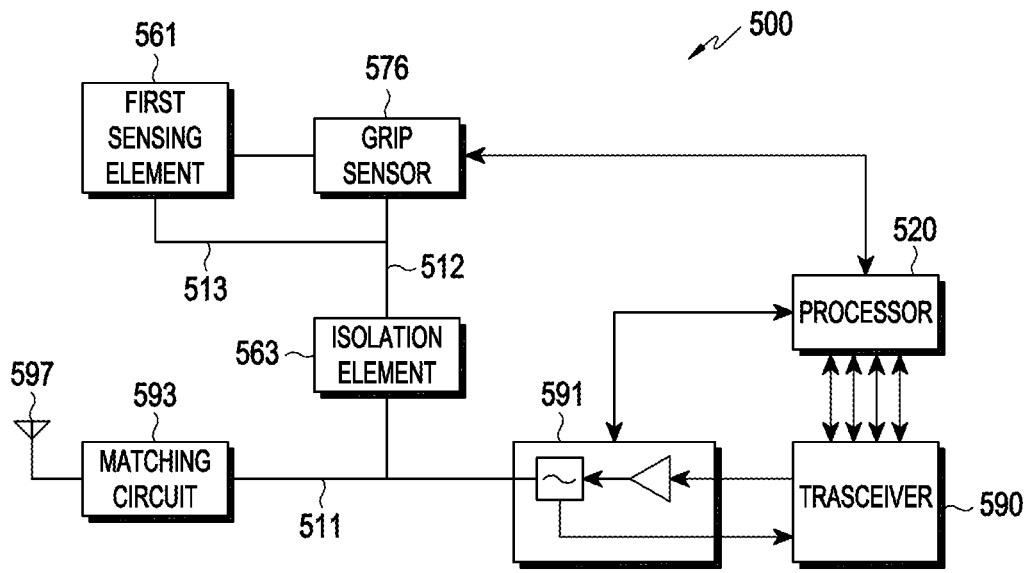
FIG. 9 is a block diagram illustrating an example configuration of an electronic device according to various embodiments.

FIG. 9 is a block diagram illustrating an example configuration of an electronic device 500 (e.g., the electronic device 101, 102, 104, 200, or 300 of FIGS. 1 to 4) according to various embodiments.

Referring to FIG. 9, an electronic device 500 may include a processor (e.g., including processing circuitry) 520 (e.g., the processor 120 of FIG. 1), a communication module (e.g., the communication module 190 of FIG. 1) such as a transceiver 590 and/or a wireless communication circuit 591, a grip sensor 576, a first sensing element (e.g., including a via) 561, and at least one antenna 597 (e.g., the second antenna 441*b* of FIG. 5 or 6). The antenna 597 may function as a second sensing element. In the following detailed description, reference number '597' may be commonly used to denote the antenna or the second sensing element. The transceiver 590 may communicate receive (Rx) digital signals, transmit analog I/Q signals, and/or control signals to/from the processor 520. In various embodiments, the transceiver 590 may generate a communication signal and provide it to the wireless communication circuit 591. The wireless communication circuit 591 may be, e.g., a radio frequency (RF) front end, and may include a circuit, such as a duplexer, a power amplifier, and/or a low noise amplifier, and it may receive communication signals from the transceiver 590 or provide the signal received through the antenna 597 to the transceiver 590. In various embodiments, the electronic device 500 may further include a matching circuit 593 disposed between the wireless communication circuit 591 and the antenna 591.

According to various embodiments, the grip sensor 576 may be controlled by the processor 520, and it may be electrically connected with the first sensing element 561 or the second sensing element 597 (e.g., an antenna) through at least some of signal lines 511, 512, and 513. As described above, the first sensing element 561 or the second sensing element 597 may be disposed adjacent to at least a portion of the outer surface of the housing (e.g., the housing 310 of FIGS. 4 to 7) and create a capacitance according to an approach or contact state of an external object. In an embodiment, the grip sensor 576 may detect creation of a capacitance of a designated value or more or a change in capacitance using the first sensing element 561 or the second sensing element 597. For example, the grip sensor 576 may detect an approach or contact state of an external object to the housing 310 using the first sensing element 561 or the second sensing element 597.

According to various embodiments, the electronic device 500 may include a first signal line 511, a second signal line 512, and/or a third signal line 513. The first signal line 511 may be, e.g., a line electrically connecting the wireless communication circuit 591 and the antenna 597, and the matching element 593 may be disposed as a portion of the first signal line 511. For example, the first signal line 511 may be configured to transmit a radio frequency signal between the communication module (e.g., the communication module 190 of FIG. 1 or the wireless communication circuit 591 of FIG. 9) and the antenna 597. In various embodiments, the second signal line 512 may electrically connect the first signal line 511 and the grip sensor 576. For example, the grip sensor 597 may be electrically connected with the second sensing element 576 (e.g., an antenna) through a portion of the first signal line 511 and the second signal line 512. A signal (hereinafter, a 'detection signal') based on whether capacitance is generated or a change in capacitance may be transferred between the grip sensor 576 and the second sensing element 576 through, at least, the second signal line 512.

According to various embodiments, the electronic device 500 or the second signal line 512 may include a first isolation element 563. The first isolation element 563 may be, e.g., an inductive element, such as an inductor, and may be configured to function as a high-impedance circuit for radio frequency signals transmitted between the wireless communication circuit 591 and the antenna 597 and may be configured to function as a closed circuit for detection signals based on whether capacitance is generated or a change in capacitance. For example, the first isolation element 563 may transfer a detection signal between the grip sensor 576 and the second sensing element 597 (e.g., an antenna) but may suppress or block the inflow, into the grip sensor 563, of the radio frequency signal transferred between the communication module (e.g., the wireless communication circuit 591) and the antenna 597.

According to various embodiments, the third signal line 513 may electrically connect the first sensing element 561 with the second signal line 512 or the grip sensor 576. For example, the first sensing element 561 may be electrically connected with the grip sensor 576 through a portion of the second signal line 512 and the third signal line 513 or may be electrically connected with the grip sensor 576 through the third signal line 513 without passing through the second signal line 512. When connected with the second signal line 512, the third signal line 513 may be connected to the second signal line 512, between the first isolation element 563 and the grip sensor 576. For example, in an environment independent from the radio frequency signal transferred through the first signal line 511, the first sensing element 561 may be electrically connected with the grip sensor 576.

Figure 10:
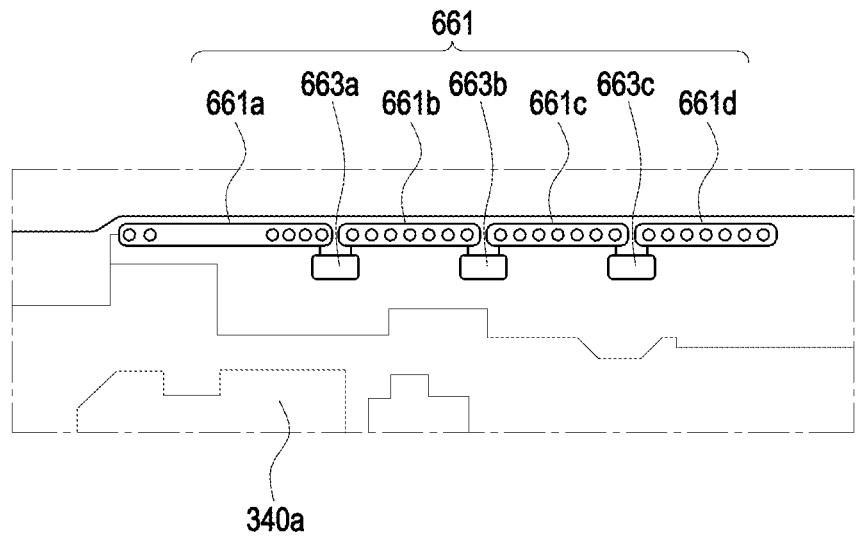
FIG. 10 is a diagram illustrating a printed circuit board of an electronic device according to various embodiments.
Figure 11:
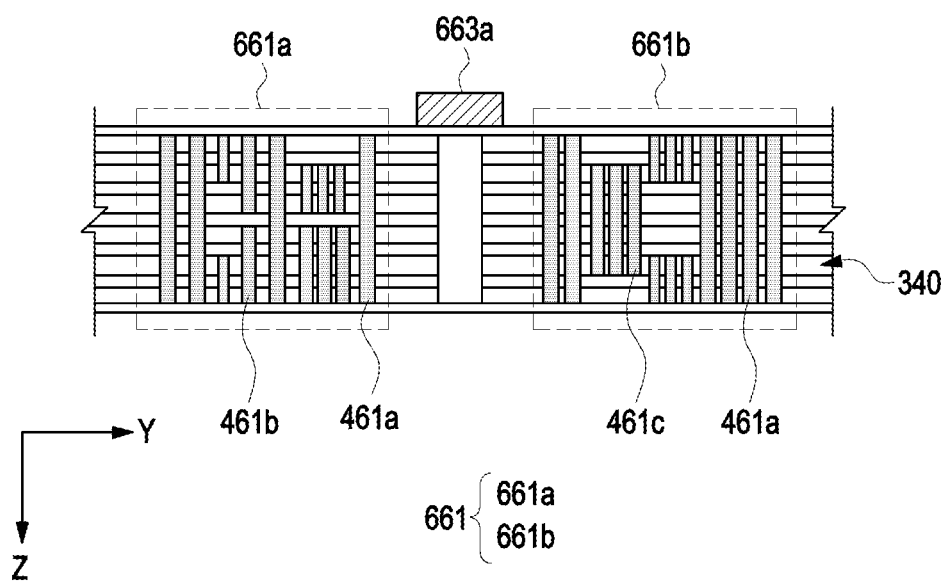
FIG. 11 is a diagram illustrating a side configuration of a first sensing element of an electronic device according to various embodiments.
Figure 12:
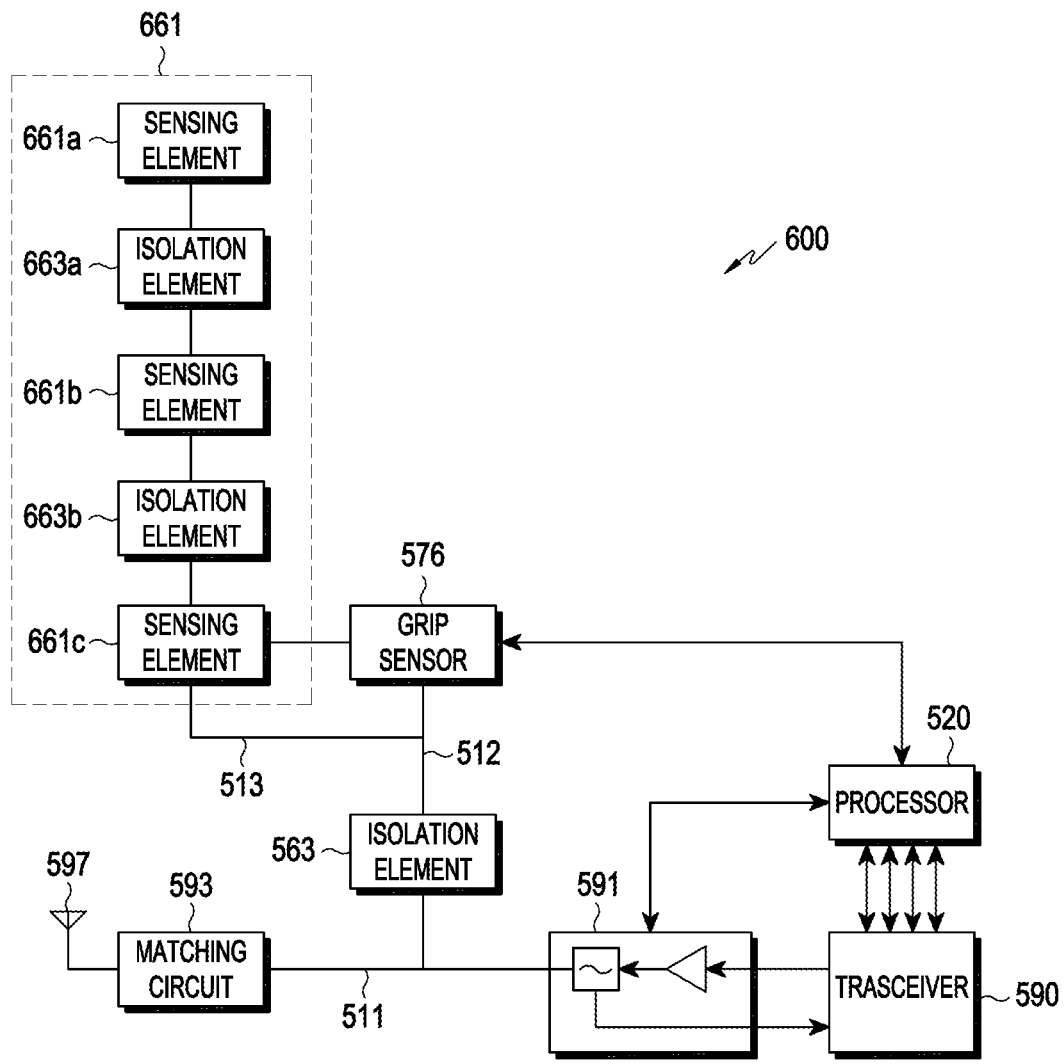
FIG. 12 is a block diagram illustrating an example configuration of an electronic device according to various embodiments of the disclosure.

FIG. 10 is a plan view illustrating a printed circuit board 340*a* (e.g., the printed circuit board 340 of FIG. 4) of an electronic device (e.g., the electronic device 101, 102, 104, 200, or 300 of FIGS. 1 to 4) according to various embodiments. FIG. 11 is a diagram illustrating a side configuration of a first sensing element 661 (e.g., the first sensing element 461 of FIG. 6) of an electronic device according to various embodiments. FIG. 12 is a block diagram illustrating an example configuration of an electronic device 600 according to various embodiments.

Referring to FIGS. 10, 11 and 12, an electronic device 600 or a first sensing element 661 may include at least one second isolation element 663*a*, 663*b* and 663*c*. Similar to the first isolation element 563, the second isolation elements 663*a*, 663*b* and 663*c* may function as a high-impedance circuit for radio frequency signals and function as a closed circuit for the detection signal. For example, the second isolation elements 663*a*, 663*b* and 663*c* may include an inductive element, such as an inductor. According to an embodiment, as the second isolation elements 663*a*, 663*b* and 663*c* are disposed, an electrical length of the first sensing element 661 for radio frequency signals may be set. As the second sensing element 597 (e.g., the second antenna 441*b* of FIG. 6) is disposed adjacent to the first sensing element 661 to function as an antenna, the second isolation elements 663*a*, 663*b* and 663*c* may prevent and/or reduce deterioration of antenna performance In relation to the embodiment illustrated by way of non-limiting example in FIGS. 10, 11 and 12, components similar to those in the foregoing embodiment may not be described in detail, and a configuration different from that of the foregoing embodiment, e.g., a structure in which the first sensing element 661 includes the second isolation elements 663*a*, 663*b* and 663*c*, is described in greater detail below.

According to various embodiments, the electronic device 600 and/or the first sensing element 661 may include a plurality of conductive via arrays 661*a*, 661*b*, 661*c* and 661*d* formed of combinations of some selected from among the conductive vias 461*a*, 461*b*, and 461*c*. The second isolation elements 663*a* and 663*b* may be alternately disposed with the conductive via arrays 661*a*, 661*b*, and 661*c* to form a series connection with the conductive via arrays 661*a*, 661*b* and 661*c*. For example, the first sensing element 661 may have a flat plate shape with a width (e.g., the thickness in the Z-axis direction) and a length (e.g., the length in the Y-axis direction) corresponding to the area in which the conductive vias 461*a*, 461*b*, and 461*c* are arranged, in generating a capacitance according to an approach or contact state of an external object and, for the radio frequency signal transmitted/received through the second sensing element 597, it may have an electrical length set by the length and width of the unit conductive via arrays 661*a*, 661*b*, and 661*c*.

According to various embodiments, in a structure in which the second sensing element 597 functions as an antenna and is disposed adjacent to the first sensing element 661, the radiation power of the antenna may be induced at the first sensing element 661 when performing wireless communication. For example, when the first sensing element 661 has an electrical length similar to the wavelength of the communication frequency, the wireless communication performance may be deteriorated. Here, "an electrical length similar to the wavelength of the communication frequency" may refer, for example, to the electrical length corresponding to the communication frequency wavelength, the electrical length corresponding to $1/n$ times the communication frequency wavelength (where, 'n' is a natural number), and/or the electrical length corresponding to $1/2$ or $1/4$ of the communication frequency wavelength. In an embodiment, the second isolation elements 663a, 663b and 663c may function as high-impedance circuits for radio frequency signals, so that the electrical length of the first sensing element for radio frequency signals may be set corresponding to the length of any one of the conductive via array 661a, and 661b. For example, if the first sensing element 661 is structured to have an electrical length or width equal to or similar to the communication frequency wavelength, two second isolation elements 663a and 663b may be disposed to suppress or prevent and/or reduce the radiation power of the antenna from being induced at the first sensing element 661.

It was identified that, as the above-described first sensing element 461, 561, or 661 is disposed, the distance for recognizing an approach of an external object from a side surface of the housing 310 or the electronic device 300, 500, or 600 was enhanced by 25% from about 8 mm to 100 mm and, although the first sensing element 461, 561, or 661 is disposed adjacent to the antenna (e.g., the second antenna 441b of FIG. 6), no substantial change occurred in communication performance.

According to various example embodiments of the disclosure, an electronic device (e.g., the electronic device 101, 102, 104, 200, 300, 500, or 600 of FIG. 1 to 4, 9, or 12) may comprise: a housing (e.g., the housing 210 or 310 of FIGS. 2 to 6) including: a first surface (e.g., the first surface 210A of FIG. 2), a second surface (e.g., the second surface 210B of FIG. 3) facing in a direction opposite to the first surface, and a side surface (e.g., the side surface 210C of FIG. 2) at least partially surrounding a space between the first surface and the second surface; a printed circuit board (e.g., the printed circuit board 340, 340a, or 340b of FIGS. 4 to 6) disposed between the first surface and the second surface; a first sensing element (e.g., the first sensing element 461, 561, or 661 of FIGS. 6 to 12) including a plurality of conductive vias (e.g., the conductive vias 461, 461b, and 461c of FIG. 7 or 8) arranged in parallel to the side surface, in at least a portion of an edge of the printed circuit board, and a grip sensor (e.g., the sensor module 176 of FIG. 1 or the grip sensor 576 of FIG. 9 or 12) electrically connected with the first sensing element. The grip sensor may be configured to: detect a change in capacitance due to an approach or contact state of an external object (e.g., the user's body) to the housing, in at least a portion of the side surface of the housing using the first sensing element.

According to various example embodiments, the conductive vias may extend obliquely or perpendicular (e.g., along the Z-axis direction of FIG. 8) to the first surface or the second surface and arranged along a direction (e.g., the Y-axis direction of FIG. 8) side by side with or parallel to the side surface.

According to various example embodiments, the printed circuit board may include a plurality of conductive layers (e.g., the conductive layer 341a of FIG. 8) or a plurality of conductive patterns sequentially stacked on, at least, the edge. At least one of the conductive vias may be configured to electrically connect at least two of the plurality of conductive layers or electrically connect at least two of the plurality of conductive patterns.

According to various example embodiments, the electronic device may further comprise: a second sensing element (e.g., the second sensing element 441b of FIG. 6 or the antenna 597 of FIG. 9) comprising a conductor disposed adjacent to the first sensing element inside the housing and disposed to face any one of the first surface and the second surface. The grip sensor may be electrically connected with the second sensing element and configured to detect the change in capacitance due to the approach or contact state of the external object to the housing using the second sensing element.

According to various example embodiments, the electronic device may further comprise: a communication module (e.g., the communication module 190 of FIG. 1 or the wireless communication circuit 591 of FIG. 9) comprising communication circuitry electrically connected with the second sensing element. The second sensing element may comprise a designated pattern, and the communication module may be configured to perform wireless communication using the second sensing element.

According to various example embodiments, the electronic device may further comprise: a second sensing element comprising a conductor disposed adjacent to the first sensing element inside the housing and disposed to face any one of the first surface and the second surface, a communication module comprising communication circuitry electrically connected with the second sensing element, a first signal line (e.g., the first signal line 511 of FIG. 9) electrically connecting the communication module with the second sensing element, and a second signal line (e.g., the second signal line 512 of FIG. 9) electrically connecting the first signal line with the grip sensor. The communication module may be configured to perform wireless communication using the second sensing element, and the grip sensor is configured to detect the change in capacitance due to the approach or contact state of the external object to the housing using the second sensing element.

According to various example embodiments, the second signal line may include a first isolation element (e.g., the second isolation element 563 of FIG. 9) comprising isolation circuitry. The first isolation element may be configured to function as a high-impedance circuit for a radio frequency signal transferred between the communication module and the second sensing element and function as a closed circuit for a signal based on the change in capacitance due to the approach or contact state of the external object (e.g., the user's body), as a signal transferred between the grip sensor and the second sensing element.

According to various example embodiments, the electronic device may further comprise a third signal line (e.g., the third signal line 513 of FIG. 9) electrically connecting the first sensing element to the second signal line, between the first isolation element and the grip sensor.

According to various example embodiments, the first sensing element may further include a plurality of conductive via arrays (e.g., the conductive via arrays 661a, 661b, and 661c of FIGS. 10 to 12) formed as a combination of conductive vias selected from among the conductive vias and at least one second isolation element (e.g., the second isolation elements 663a and 663b of FIGS. 10 to 12) alternately disposed with the conductive via arrays and forming a series connection with the conductive via arrays. The second isolation element may be configured to function as a high-impedance circuit for a radio frequency signal and function as a closed circuit for a signal based on the change in capacitance due to the approach or contact state of the external object.

According to various example embodiments, the electronic device may further comprise: a second sensing element comprising a conductor disposed to face any one of the first surface and the second surface inside the housing and disposed adjacent to the first sensing element. The grip sensor may be electrically connected with the second sensing element and configured to detect the change in capacitance due to the approach or contact state of the external object to the housing using the second sensing element.

According to various example embodiments, the electronic device may further comprise a communication module comprising communication circuitry electrically connected with the second sensing element. The communication module may be configured to perform wireless communication using the second sensing element.

According to various example embodiments, an electronic device may comprise: a second sensing element comprising a conductor disposed to face any one of the first surface and the second surface inside the housing and disposed adjacent to the first sensing element, a communication module comprising communication circuitry electrically connected with the second sensing element and configured to perform wireless communication using the second sensing element, and a first isolation element comprising isolation circuitry electrically connecting the second sensing element with the grip sensor. The grip sensor may be electrically connected with the second sensing element and configured to detect the change in capacitance due to the approach or contact state of the external object to the housing using the second sensing element. The communication module may be configured to perform wireless communication using the second sensing element. The first isolation element may be configured to function as a high-impedance circuit for a radio frequency signal transferred between the communication module and the second sensing element and function as a closed circuit for a signal based on the change in capacitance due to the approach or contact state of the external object, as a signal transferred between the grip sensor and the second sensing element.

According to various example embodiments, the electronic device may further comprise a display (e.g., the display module or display 160, 201, or 330 of FIG. 1, 2, or 3) disposed on the first surface and configured to output a screen through at least a portion of the first surface. The display may include a touch sensor or a pressure sensor (e.g., the input module 150 of FIG. 1).

According to various example embodiments of the disclosure, an electronic device (e.g., the electronic device 101, 102, 104, 200, 300, 500, or 600 of FIG. 1 to 4, 9, or 12) may comprise: a housing (e.g., the housing 210 or 310 of FIGS. 2 to 6) including: a first surface (e.g., the first surface 210A of FIG. 2), a second surface (e.g., the second surface 210B of FIG. 3) facing in a direction opposite to the first surface, and a side surface (e.g., the side surface 210C of FIG. 2) at least partially surrounding a space between the first surface and the second surface; a printed circuit board (e.g., the printed circuit board 340, 340a, or 340b of FIGS. 4 to 6) disposed between the first surface and the second surface; a first sensing element (e.g., the first sensing element 461, 561, or 661 of FIGS. 6 to 12) including a plurality of conductive vias (e.g., the conductive vias 461a, 461b, and 461c of FIG. 7 or 8) arranged in parallel to the side surface, in at least a portion of an edge of the printed circuit board, a second sensing element (e.g., the second sensing element 441b of FIG. 6 or the antenna 597 of FIG. 9) comprising a conductor disposed adjacent to the first sensing element between the printed circuit board and the second surface and disposed to face the second surface, a communication module (e.g., the communication module 190 of FIG. 1 or the wireless communication circuit 591 of FIG. 9) comprising communication circuitry electrically connected with the second sensing element and configured to perform wireless communication using the second sensing element, and a grip sensor (e.g., the sensor module 176 of FIG. 1 or the grip sensor 576 of FIG. 9 or 12) electrically connected to the first sensing element and the second sensing element. The grip sensor may be configured to detect a change in capacitance due to an approach or contact state of an external object to the housing using the first sensing element or the second sensing element.

According to various example embodiments, the electronic device may further comprise: a first signal line (e.g., the first signal line 511 of FIG. 9) electrically connecting the communication module with the second sensing element and a second signal line (e.g., the second signal line 512 of FIG. 9) electrically connecting the first signal line with the grip sensor and including a first isolation element (e.g., the first isolation element 563 of FIG. 9) comprising isolation circuitry. The first isolation element may be configured to function as a high-impedance circuit for a radio frequency signal transferred between the communication module and the second sensing element and function as a closed circuit for a signal based on the change in capacitance due to the approach or contact state of the external object (e.g., the user's body), as a signal transferred between the grip sensor and the second sensing element.

According to various example embodiments, the electronic device may further comprise: a third signal line (e.g., the third signal line 513 of FIG. 9) electrically connecting the first sensing element to the second signal line. The third signal line may be electrically connected with the second signal line, between the first isolation element and the grip sensor.

According to various example embodiments, the first sensing element may include a plurality of conductive via arrays (e.g., the conductive via arrays 661a, 661b, and 661c of FIGS. 10 to 12) formed of a combination of conductive vias selected from among the conductive vias.

According to various example embodiments, the first sensing element may further include at least one second isolation element (e.g., the second isolation elements 663a and 663b of FIGS. 10 to 12) comprising isolation circuitry alternately disposed with the conductive via arrays and forming a series connection with the conductive via arrays. The second isolation element may be configured to function as a high-impedance circuit for a radio frequency signal and function as a closed circuit for a signal based on the change in capacitance due to the approach or contact state of the external object (e.g., the user's body).

According to various example embodiments, the printed circuit board may include a plurality of conductive patterns (e.g., the conductive layer 341a of FIG. 8) sequentially stacked on, at least, the edge. The conductive vias may extend obliquely or perpendicular to the first surface or the second surface, and at least one of the conductive vias may be configured to electrically connect at least two of the plurality of conductive patterns.

According to various example embodiments, the electronic device may further comprise a display (e.g., the display module or display 160, 201, or 330 of FIG. 1, 2, or 3) disposed on the first surface and configured to output a screen through at least a portion of the first surface. The display may include a touch sensor or a pressure sensor (e.g., the input module 150 of FIG. 1).

While the disclosure has been illustrated and described with reference to various example embodiments, it should be appreciated that the various example embodiments are intended to be illustrative, not limiting. It will be further understood by one of ordinary skill in the art that various changes may be made in form and detail without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a housing including a first surface, a second surface facing in a direction opposite to the first surface, and a side surface at least partially surrounding a space between the first surface and the second surface;
   a printed circuit board disposed between the first surface and the second surface;
   a first sensing element including a plurality of conductive vias arranged in parallel to the side surface, in at least a portion of an edge of the printed circuit board; and
   a grip sensor electrically connected with the first sensing element,
   wherein the grip sensor is configured to detect a change in capacitance due to an approach or contact state of an external object to the housing, in at least a portion of the side surface of the housing using the first sensing element.

2. The electronic device of claim 1, wherein the conductive vias extend obliquely or perpendicular to the first surface or the second surface and are arranged along a direction side by side with or parallel to the side surface.

3. The electronic device of claim 1, wherein the printed circuit board includes a plurality of conductive layers or a plurality of conductive patterns stacked on at least the edge of the printed circuit board, and
   wherein at least one of the conductive vias are configured to electrically connect at least two of the plurality of conductive layers or electrically connect at least two of the plurality of conductive patterns.

4. The electronic device of claim 1, further comprising: a second sensing element comprising a conductor disposed adjacent to the first sensing element inside the housing and disposed to face any one of the first surface and the second surface,
   wherein the grip sensor is electrically connected with the second sensing element and is configured to detect the change in capacitance due to the approach or contact state of the external object to the housing using the second sensing element.

5. The electronic device of claim 4, further comprising a communication module comprising communication circuitry electrically connected with the second sensing element,
   wherein the second sensing element comprises a designated pattern, and the communication module is configured to perform wireless communication using the second sensing element.

6. The electronic device of claim 1, further comprising:
   a second sensing element comprising a conductor disposed adjacent to the first sensing element inside the housing and disposed to face any one of the first surface and the second surface;
   a communication module comprising communication circuitry electrically connected with the second sensing element;
   a first signal line electrically connecting the communication module with the second sensing element; and
   a second signal line electrically connecting the first signal line with the grip sensor,
   wherein the communication module is configured to perform wireless communication using the second sensing element, and the grip sensor is configured to detect the change in capacitance due to the approach or contact state of the external object to the housing using the second sensing element.

7. The electronic device of claim 6, wherein the second signal line includes a first isolation element comprising isolation circuitry, and
   wherein the first isolation element is configured as a high-impedance circuit for a radio frequency signal transferred between the communication module and the second sensing element and as a closed circuit for a signal being transferred between the grip sensor and the second sensing element based on the change in capacitance due to the approach or contact state of the external object.

8. The electronic device of claim 6, further comprising a third signal line electrically connecting the first sensing element to the second signal line and disposed between the first isolation element and the grip sensor.

9. The electronic device of claim 1, wherein the first sensing element further includes,
   a plurality of conductive via arrays comprising a combination of conductive vias selected from among the conductive vias; and
   at least one second isolation element comprising a conductor alternately disposed with the conductive via arrays and forming a series connection with the conductive via arrays,
   wherein the second isolation element is configured as a high-impedance circuit for a radio frequency signal and as a closed circuit for a signal based on the change in capacitance based on the approach or contact state of the external object.

10. The electronic device of claim 9, further comprising a second sensing element comprising a conductor disposed to face any one of the first surface and the second surface inside the housing and disposed adjacent to the first sensing element,
    wherein the grip sensor is electrically connected with the second sensing element and configured to detect the change in capacitance due to the approach or contact state of the external object to the housing using the second sensing element.

11. The electronic device of claim 10, further comprising a communication module comprising communication circuitry electrically connected with the second sensing element,
    wherein the communication module is configured to perform wireless communication using the second sensing element.

12. The electronic device of claim 1, further comprising:
    a second sensing element comprising a conductor disposed to face any one of the first surface and the second surface inside the housing and disposed adjacent to the first sensing element;
    a communication module comprising communication circuitry electrically connected with the second sensing element and configured to perform wireless communication using the second sensing element; and
    a first isolation element comprising isolation circuitry electrically connecting the second sensing element with the grip sensor,
    wherein the grip sensor is electrically connected with the second sensing element and configured to detect the change in capacitance due to the approach or contact state of the external object to the housing using the second sensing element, wherein the communication module is configured to perform wireless communication using the second sensing element, and wherein the first isolation element is configured as a high-impedance circuit for a radio frequency signal transferred between the communication module and the second sensing element and as a closed circuit for a signal being transferred between the grip sensor and the second sensing element based on the change in capacitance due to the approach or contact state of the external object.

13. The electronic device of claim 1, further comprising a display disposed on the first surface and configured to output a screen through at least a portion of the first surface, wherein the display includes a touch sensor or a pressure sensor.

14. An electronic device comprising:
a housing including a first surface, a second surface facing in a direction opposite to the first surface, and a side surface at least partially surrounding a space between the first surface and the second surface;
a printed circuit board disposed between the first surface and the second surface;
a first sensing element including a plurality of conductive vias arranged in parallel to the side surface in at least a portion of an edge of the printed circuit board;
a second sensing element comprising a conductor disposed adjacent to the first sensing element between the printed circuit board and the second surface and disposed to face the second surface;
a communication module comprising communication circuitry electrically connected with the second sensing element and configured to perform wireless communication using the second sensing element; and
a grip sensor electrically connected to the first sensing element and the second sensing element,
wherein the grip sensor is configured to detect a change in capacitance due to an approach or contact state of an external object to the housing using the first sensing element or the second sensing element.

15. The electronic device of claim 14, further comprising:
a first signal line electrically connecting the communication module with the second sensing element; and
a second signal line electrically connecting the first signal line with the grip sensor and including a first isolation element comprising isolation circuitry,
wherein the first isolation element is configured as a high-impedance circuit for a radio frequency signal transferred between the communication module and the second sensing element and a closed circuit for a signal being transferred between the grip sensor and the second sensing element based on the change in capacitance due to the approach or contact state of the external object.

16. The electronic device of claim 15, further comprising a third signal line electrically connecting the first sensing element to the second signal line,
wherein the third signal line is electrically connected with the second signal line, between the first isolation element and the grip sensor.

17. The electronic device of claim 14, wherein the first sensing element includes a plurality of conductive via arrays comprising a combination of conductive vias selected from among the conductive vias.

18. The electronic device of claim 17, wherein the first sensing element further includes at least one second isolation element comprising isolation circuitry alternately disposed with the conductive via arrays and forming a series connection with the conductive via arrays, and
wherein the second isolation element is configured as a high-impedance circuit for a radio frequency signal and as a closed circuit for a signal based on the change in capacitance due to the approach or contact state of the external object.

19. The electronic device of claim 14, wherein the printed circuit board includes a plurality of conductive patterns stacked on at least the edge of the printed circuit board, and
wherein the conductive vias extend obliquely or perpendicular to the first surface or the second surface, and at least one of the conductive vias is configured to electrically connect at least two of the plurality of conductive patterns.

20. The electronic device of claim 14, further comprising a display disposed on the first surface and configured to output a screen through at least a portion of the first surface,
wherein the display includes a touch sensor or a pressure sensor.

* * * * *